US012486802B2

(12) United States Patent
Ugai et al.

(10) Patent No.: US 12,486,802 B2
(45) Date of Patent: Dec. 2, 2025

(54) CYLINDER FOR COMBUSTOR, COMBUSTOR, AND GAS TURBINE

(71) Applicant: MITSUBISHI HEAVY INDUSTRIES, LTD., Tokyo (JP)

(72) Inventors: Ken Ugai, Tokyo (JP); Tetsu Konishi, Tokyo (JP); Teruhiro Matsumoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/273,090

(22) PCT Filed: Feb. 24, 2022

(86) PCT No.: PCT/JP2022/007623
§ 371 (c)(1),
(2) Date: Jul. 19, 2023

(87) PCT Pub. No.: WO2022/181694
PCT Pub. Date: Sep. 1, 2022

(65) Prior Publication Data
US 2024/0077026 A1 Mar. 7, 2024

(30) Foreign Application Priority Data
Feb. 25, 2021 (JP) ................................ 2021-028331

(51) Int. Cl.
*F02C 7/18* (2006.01)
*F23R 3/10* (2006.01)

(52) U.S. Cl.
CPC .................. *F02C 7/18* (2013.01); *F23R 3/10* (2013.01); *F05D 2260/201* (2013.01)

(58) Field of Classification Search
CPC .... F23R 3/04; F23R 3/045; F23R 3/06; F23R 2900/03041; F23R 2900/03042;
(Continued)

(56) References Cited

U.S. PATENT DOCUMENTS 5,865,030 A * 2/1999 Matsuhama ............ F02C 7/224 60/737
8,661,827 B2 * 3/2014 Morimoto ............... F01D 9/023 29/463
(Continued)

FOREIGN PATENT DOCUMENTS

JP 2003328775 11/2003
JP 2009-92373 4/2009
(Continued)

OTHER PUBLICATIONS

International Search Report issued Apr. 26, 2022 in International (PCT) Application No. PCT/JP2022/007623, with English-language translation.
(Continued)

*Primary Examiner* — Devon C Kramer
*Assistant Examiner* — Sean V Meiller
(74) *Attorney, Agent, or Firm* — Wenderoth, Lind & Ponack, L.L.P.

(57) ABSTRACT

A cylinder for combustion comprises a barrel having a cylindrical shape, and an air supply pipe. An insertion opening and a plurality of cooling flow paths are formed in the barrel. Collision region flow paths of the plurality of cooling flow paths each have a collision region circumvention flow path part intersecting with a collision gas axis extending in the direction of the flow of combustion gas moving toward a pipe center axis of the air supply pipe. The collision region circumvention flow path parts have an upstream-side direction component from the collision gas axis along the edge of the insertion opening, and have a downstream-side direction component from the collision gas axis along the edge of the insertion opening. No exit is formed in a portion of the collision region circumvention
(Continued)

flow path parts within the range of specified angles about the pipe center axis.

11 Claims, 7 Drawing Sheets

(58) Field of Classification Search
CPC .. F23R 2900/03043; F23R 2900/03044; F05D 2260/201; F05D 2260/202; F05D 2260/203; F05D 2260/204
See application file for complete search history.

(56) References Cited

U.S. PATENT DOCUMENTS

| | | | | |
|---|---|---|---|---|
| 10,267,520 | B2 * | 4/2019 | Shenny | F23R 3/002 |
| 10,386,071 | B2 * | 8/2019 | Strzepek | F23R 3/46 |
| 11,073,285 | B2 * | 7/2021 | Quach | F23R 3/06 |
| 11,480,337 | B2 * | 10/2022 | Prociw | F23R 3/005 |
| 11,718,803 | B2 * | 8/2023 | Konagayoshi | C10J 3/76 48/67 |
| 2009/0120095 | A1 | 5/2009 | Berry et al. | |
| 2018/0320898 | A1 | 11/2018 | Uhm | |
| 2019/0048799 | A1 | 2/2019 | Kishida | |
| 2021/0025323 | A1 | 1/2021 | Nakao et al. | |

FOREIGN PATENT DOCUMENTS

| | | |
|---|---|---|
| JP | 5618472 | 9/2014 |
| JP | 2017-160874 | 9/2017 |
| JP | 2019-163757 | 9/2019 |

OTHER PUBLICATIONS

Written Opinion of the International Searching Authority issued Apr. 26, 2023 in International (PCT) Application No. PCT/JP2022/007623, with English-language translation.
Written Opinion of the International Searching Authority issued Apr. 26, 2022 in International (PCT) Application No. PCT/JP2022/007623, with English-language translation.

* cited by examiner

CYLINDER FOR COMBUSTOR, COMBUSTOR, AND GAS TURBINE

TECHNICAL FIELD

The present invention relates to a combustor cylinder that defines a flow path through which a combustion gas flows, a combustor including the combustor cylinder, and a gas turbine including the combustor.

Priority is claimed on Japanese Patent Application No. 2021-028331, filed on Feb. 25, 2021, the content of which is incorporated herein by reference.

BACKGROUND ART

A combustor of a gas turbine includes a combustor cylinder that defines a flow path of a combustion gas, and a combustor body that injects a fuel together with air into the combustor cylinder. Inside the combustor cylinder, the fuel is subjected to combustion, and the combustion gas generated through the combustion of the fuel flows.

As the combustor cylinder, for example, there is a combustor cylinder disclosed in PTL 1 below. The combustor cylinder includes a barrel having a cylindrical shape around an axis, and an air supply pipe attached to the barrel. The cylindrical barrel has an opening that penetrates an inner peripheral surface thereof from an outer peripheral surface thereof, and a plurality of cooling flow paths through which a cooling medium flows. In the plurality of cooling flow paths, outlets of some cooling flow paths are formed in an edge of the opening. The air supply pipe functions to supply secondary air for combustion to an inner peripheral side of the barrel. The air supply pipe has a cylindrical pipe body and a lip portion provided in the pipe body. A part of the pipe body is inserted into the inner peripheral side of the barrel from the opening, and protrudes to the inner peripheral side of the barrel. The above-described lip portion is provided in, of both ends of the pipe body, an end of the inner peripheral side of the barrel.

Patent Literature

A high-temperature combustion gas flows on the inner peripheral side of the barrel in the combustor cylinder disclosed in Japanese Unexamined Patent Application Publication No. 2009-092373 (hereinafter JP '373). Some of the combustion gas collides with a portion of the air supply pipe which is located on the inner peripheral side of the barrel. When the combustion gas collides with the air supply pipe, while a dynamic pressure thereof is lowered, a static pressure thereof rises. As a result, in the combustor cylinder disclosed in JP '373, some of the combustion gas may flow back into the cooling flow path in which the outlet is formed in the edge of the opening of the barrel, thereby possibly causing the barrel to be burnt.

Therefore, an object of the present disclosure is to provide a technique for improving durability of a combustor cylinder.

SUMMARY OF THE INVENTION

One aspect according to the present disclosure for achieving the above-described object is a combustor cylinder including a barrel that forms a cylindrical shape around a cylinder axis and that defines a circumference of a combustion space through which a combustion gas flows in a direction having a direction component, of an upstream side and a downstream side in a cylinder axis direction in which the cylinder axis extends, from the upstream side to the downstream side, and an air supply pipe attached to the barrel. The cylindrical barrel has an inner peripheral surface facing the combustion gas, an outer peripheral surface facing a side opposite to the inner peripheral surface, an insertion opening that penetrates the inner peripheral surface from the outer peripheral surface, and a plurality of separate and independent cooling flow paths extending between the inner peripheral surface and the outer peripheral surface in a direction along the inner peripheral surface and through an inside of which a cooling medium flows.

A part of the air supply pipe is inserted into an inner peripheral side of the barrel from the insertion opening, and protrudes to the inner peripheral side of the barrel. Each of the plurality of cooling flow paths has an inlet configured to introduce the cooling medium into the cooling flow path, and an outlet configured to discharge the cooling medium flowing into the cooling flow path. The plurality of cooling flow paths have a plurality of opening circumference flow paths, as some cooling flow paths in the plurality of cooling flow paths. The plurality of opening circumference flow paths have a circumvention flow path portion extending along an edge of the insertion opening.

In the plurality of opening circumference flow paths, at least one opening circumference flow path forms an impingement flow path. The impingement flow path has an impingement circumvention flow path portion, as the circumvention flow path portion. The impingement circumvention flow path portion intersects with a collision gas axis extending in a flowing direction of the combustion gas directed toward a pipe center axis, which is a radial direction of the air supply pipe with respect to the pipe center axis, extends in a direction having a direction component of the upstream side along the edge of the insertion opening from the collision gas axis, and extends in a direction having a direction component of the downstream side along the edge of the insertion opening from the collision gas axis. In the impingement circumvention flow path portion, an intersection position intersecting with the collision gas axis is located on the upstream side of the pipe center axis. In the impingement circumvention flow path portion, the outlet which opens on the inner peripheral surface is not formed in a portion within a range of a predetermined angle around the collision gas axis which is an angle around the pipe center axis.

When the combustion gas flowing inside the barrel collides with the air supply pipe, whereas a dynamic pressure thereof is lowered, a static pressure thereof rises. A static pressure rise region in which the combustion gas collides with the air supply pipe and the static pressure of the combustion gas rises is within a range of a predetermined upstream-side angle from the collision gas axis to the upstream side, which is an angle around the pipe center axis, and is within a range of a predetermined downstream-side angle from the collision gas axis to the downstream side. In the present aspect, the plurality of opening circumference flow paths having the circumvention flow path portion extending along the edge of the insertion opening are provided. Therefore, the edge of the insertion opening can be cooled by the cooling medium flowing through the circumvention flow path portion. Moreover, in the present aspect, the outlet of the impingement flow path having the impingement circumvention flow path portion is not formed in a portion inside the static pressure rise region in the impingement circumvention flow path portion. Therefore, in the present aspect, even when the combustion gas inside the barrel collides with the air supply pipe and the static pressure of the combustion gas rises inside the static pressure rise region, it is possible to prevent a backflow of the combustion gas into the impingement flow path.

As one aspect according to the present disclosure for achieving the above-described object, a combustor includes the combustor cylinder according to the first aspect, and a burner is disposed on an upstream side of the insertion opening and configured to inject a fuel into the combustion space. The burner has a burner frame having an annular fuel injection port around the cylinder axis, and a swirler provided inside the burner frame and configured to swirl the fuel ejected from the fuel injection port around the cylinder axis. The swirler is configured so that an angle of the fuel ejected from the fuel injection port with respect to the cylinder axis becomes a predetermined fuel swirl angle. An angle of the collision gas axis with respect to the cylinder axis is within a range of the fuel swirl angle±15°.

When the fuel is swirled around the cylinder axis inside the combustion space on the inner peripheral side of the barrel, the collision axis angle, which is the angle of the collision gas axis with respect to the cylinder axis, substantially becomes the fuel swirl angle. However, the collision axis angle slightly varies depending on a relationship between a ratio of an injection flow rate of the fuel to an injection flow rate of the combustion air and a swirl angle of the combustion air. Therefore, the collision axis angle does not need to completely coincide with the fuel swirl angle, and may be any angle within an angle range of the fuel swirl angle±15°.

As one aspect according to the present disclosure for achieving the above-described object, there is provided a gas turbine including the combustor according to the one aspect, a compressor configured to feed compressed air to the combustor, and a turbine configured to be driven by the combustion gas from the combustor.

Advantageous Effects of Invention

In one aspect according to the present disclosure, it is possible to improve durability of a combustor cylinder.

DESCRIPTION OF EMBODIMENTS

Hereinafter, an embodiment of a combustor cylinder, a combustor, and a gas turbine according to the present disclosure, as well as various modification examples of the combustor cylinder will be described in detail with reference to the drawings.

[Embodiment of Gas Turbine]

Figure 1:
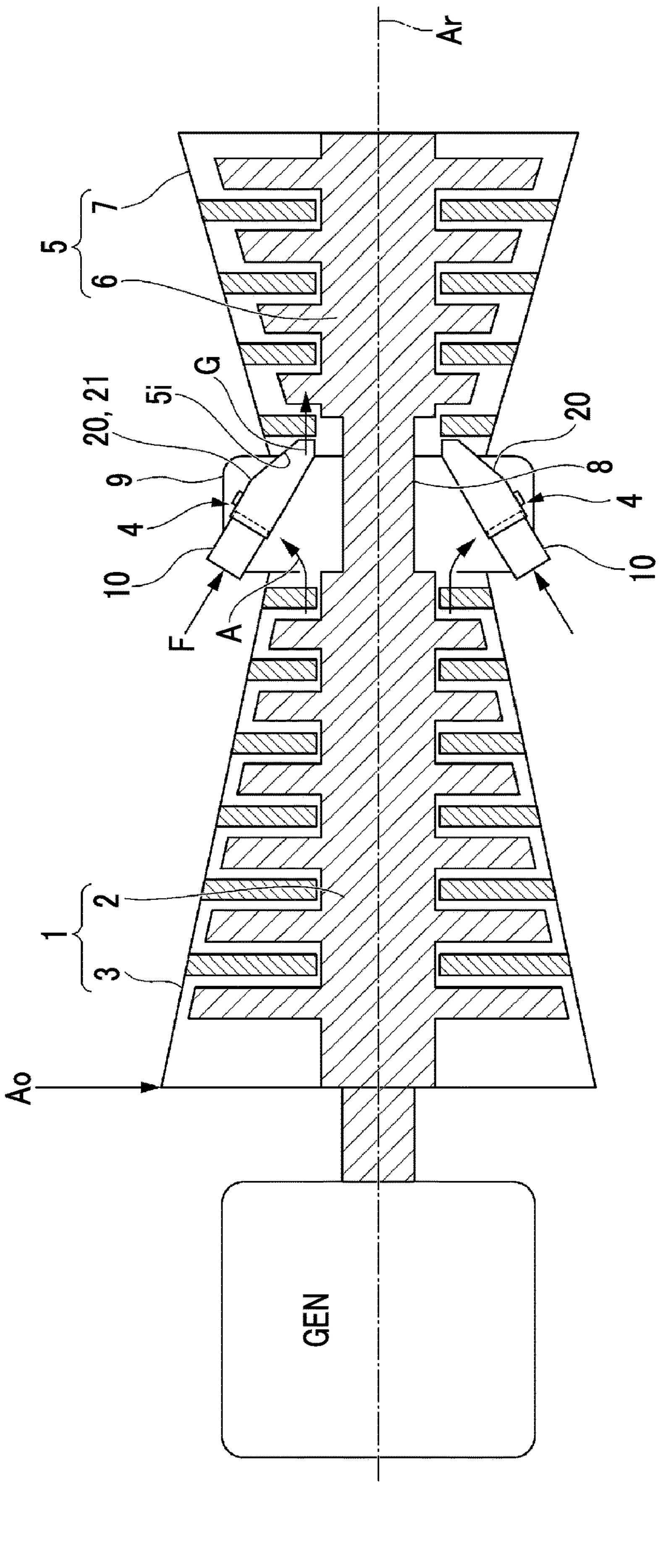
FIG. 1 is a schematic view illustrating a configuration of a gas turbine in an embodiment according to the present disclosure.

A gas turbine of the present embodiment will be described with reference to FIG. 1.

The gas turbine of the present embodiment includes a compressor 1 that compresses outside air Ao to generate compressed air A, a plurality of combustors 4 that combust a fuel F in the compressed air A to generate a combustion gas G, and a turbine 5 driven by the combustion gas G.

The compressor 1 includes a compressor rotor 2 that rotates around a rotational axis Ar, and a compressor casing 3 that covers the compressor rotor 2 to be rotatable. The turbine 5 has a turbine rotor 6 that rotates around the rotational axis Ar, and a turbine casing 7 that covers the turbine rotor 6 to be rotatable.

The compressor 1 is disposed on an upstream side with respect to the turbine 5, between the upstream side and a downstream side in a rotational axis direction in which the rotational axis Ar extends. The compressor rotor 2 and the turbine rotor 6 are located on the same rotational axis Ar, and are connected to each other to form a gas turbine rotor 8. For example, a rotor of a generator GEN is coupled to the gas turbine rotor 8.

The gas turbine further includes an intermediate casing 9. The compressor casing 3, the intermediate casing 9, and the turbine casing 7 are arranged in this order in the above-described rotational axis direction, and are connected to each other. The plurality of combustors 4 are provided in the intermediate casing 9.

The compressor 1 compresses the outside air Ao to generate the compressed air A. The compressed air A flows into the combustor 4. In addition, the fuel F is supplied to the combustor 4. Inside the combustor 4, the fuel F is combusted to generate the combustion gas G. The combustion gas G is fed into the turbine 5 to rotate the turbine rotor 6. The rotor of the generator GEN connected to the gas turbine rotor 8 is rotated by rotation of the turbine rotor 6. As a result, the generator GEN generates electricity. The fuel F in the present embodiment mainly includes a blast furnace gas from a blast furnace of a steel mill (hereinafter, referred to as a blast furnace gas (BFG)), and in some cases, a coke oven gas (COG) may be included in the BFG.

[Embodiment of Combustor Cylinder and Combustor Including Same]

A combustor cylinder and the combustor 4 including the same of the present embodiment will be described with reference to FIGS. 2 to 5.

The combustor 4 of the present embodiment includes a combustion cylinder 20 serving as a combustor cylinder that defines a combustion space S through which the combustion gas G flows, and a combustor body 10 that injects the fuel F together with the compressed air A into the combustion cylinder 20. The combustion cylinder 20 is disposed inside the intermediate casing 9 in which the compressed air A compressed by the compressor 1 floats (refer to FIG. 1).

Figure 2:
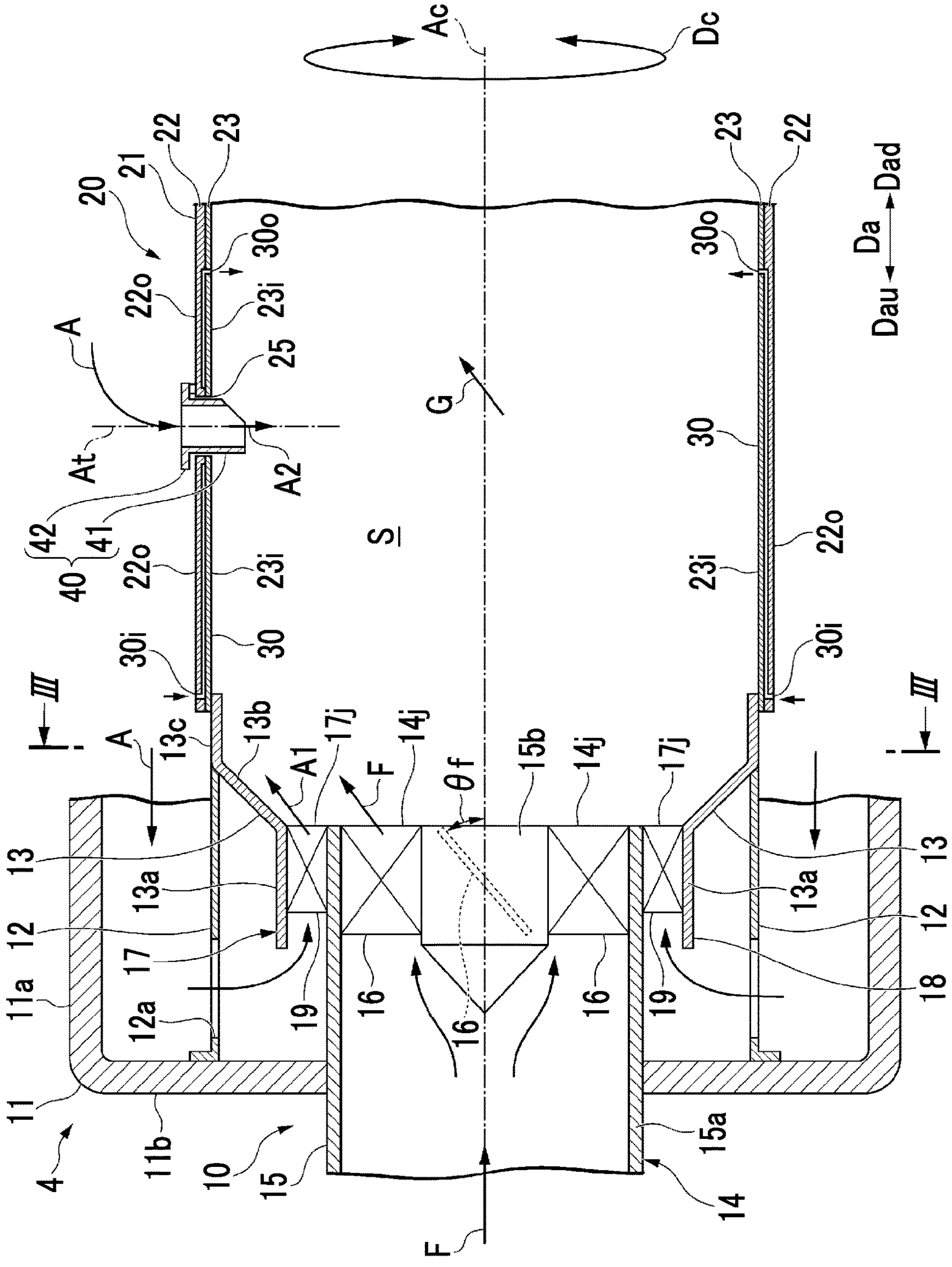
FIG. 2 is a sectional view of a main part of a combustor according to the embodiment of the present disclosure.
Figure 3:
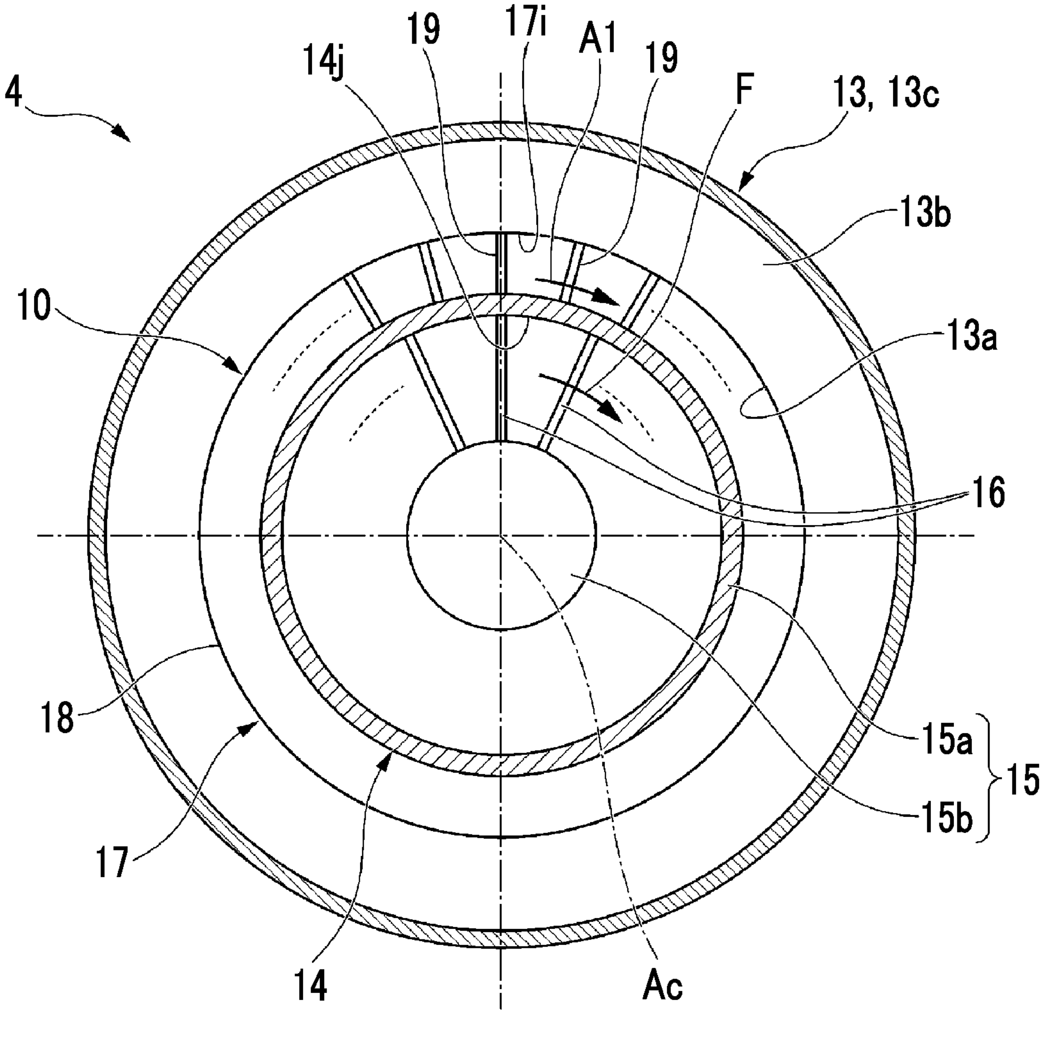
FIG. 3 is a sectional view taken along line III-III in FIG. 2.

As illustrated in FIGS. 2 and 3, the combustor body 10 has an outer cylinder 11, a support cylinder 12, an inner cylinder 13, a burner 14, and an air injector 17. All of the outer cylinder 11, the support cylinder 12, and the inner cylinder 13 have a cylindrical shape around a cylinder axis Ac. In the following, a direction in which the cylinder axis Ac extends will be referred to as a cylinder axis direction Da, one side of both sides in the cylinder axis direction Da will be referred to as an upstream side Dau, and the other side will be referred to as a downstream side Dad. In addition, a circumferential direction with respect to the cylinder axis Ac will be simply referred to as a circumferential direction Dc.

The outer cylinder 11 has an outer cylinder barrel 11*a* forming a cylindrical shape around the cylinder axis Ac, and a lid 11*b* that closes an opening on the upstream side Dau of the outer cylinder barrel 11*a*. An end of the outer cylinder barrel 11*a* on the downstream side Dad is connected to the intermediate casing 9 described above with reference to FIG. 1.

The support cylinder 12 forms a cylindrical shape around the cylinder axis Ac, and is disposed on an inner peripheral side of the outer cylinder 11. The support cylinder 12 has an air introduction opening 12*a* penetrating the inner peripheral side from an outer peripheral side. An end of the support cylinder 12 on the upstream side Dau is connected to the lid 11*b* of the outer cylinder 11. The compressed air A floating inside the intermediate casing (refer to FIG. 1) flows from the outer peripheral side of the support cylinder 12 into the inner peripheral side of the support cylinder 12 through the air introduction opening 12*a*.

The inner cylinder 13 has a small-diameter barrel 13*a*, an increasing diameter barrel 13*b*, and a large-diameter barrel 13*c*. All of the small-diameter barrel 13*a*, the increasing diameter barrel 13*b*, and the large-diameter barrel 13*c* form a cylindrical shape around the cylinder axis Ac. The small-diameter barrel 13*a* is disposed on the inner peripheral side of the support cylinder 12. An end of the increasing diameter barrel 13*b* on the upstream side Dau is connected to an end of the small-diameter barrel 13*a* on the downstream side Dad. An inner diameter of the increasing diameter barrel 13*b* gradually increases toward the downstream side Dad. The inner diameter of the end of the increasing diameter barrel 13*b* on the downstream side Dad is substantially the same as the inner diameter of the support cylinder 12. An end of the large-diameter barrel 13*c* on the upstream side Dau is connected to an end of the increasing diameter barrel 13*b* on the downstream side Dad and to an end of the support cylinder 12 on the downstream side Dad. Accordingly, the inner cylinder 13 is supported by the support cylinder 12. A space on the inner peripheral side of the increasing diameter barrel 13*b* and a space on the inner peripheral side of the large-diameter barrel 13*c* form a portion of the combustion space S on the upstream side Dau.

The burner 14 has a burner frame 15 and a plurality of fuel swirlers 16 that swirl the gas fuel F around the cylinder axis Ac. The burner frame 15 has a burner cylinder 15*a* forming a cylindrical shape around the cylinder axis Ac, and a center cylinder 15*b* disposed inside the burner cylinder 15*a*. The burner cylinder 15*a* is disposed on the inner peripheral side of the small-diameter barrel 13*a* of the inner cylinder 13. A portion of the burner cylinder 15*a* on the upstream side Dau penetrates the lid 11*b* portion of the outer cylinder 11. The burner cylinder 15*a* is fixed to the lid 11*b* portion of the outer cylinder 11. Both the end of the upstream side Dau and the end of the downstream side Dad of the burner cylinder 15*a* are open. The fuel F flows into the burner cylinder 15*a* from an opening in the end of the burner cylinder 15*a* on the upstream side Dau. The center cylinder 15*b* forms a cylindrical shape around the cylinder axis Ac, and is disposed so that its own center axis is located on the cylinder axis Ac. An annular space between the inner peripheral side of the burner cylinder 15*a* and the outer peripheral side of the center cylinder 15*b* forms a fuel flow path through which the fuel F flows. Therefore, an annular fuel injection port 14*j* is formed around the cylinder axis Ac in an end edge of the burner cylinder 15*a* on the downstream side Dad and in an end edge on the outer peripheral side of the center cylinder 15*b* on the downstream side Dad. The plurality of fuel swirlers 16 are disposed inside the fuel flow path. In the fuel swirler 16, a radial outer end with respect to the cylinder axis Ac is connected to an inner peripheral surface of the burner cylinder 15*a*, and a radial inner end with respect to the cylinder axis Ac is connected to an outer peripheral surface of the center cylinder 15*b*. The center cylinder 15*b* is fixed to the burner cylinder 15*a* via the plurality of fuel swirlers 16. The plurality of fuel swirlers 16 are configured so that an angle of the fuel F ejected from the fuel injection port 14*j* into the combustion space S with respect to the cylinder axis Ac becomes a predetermined fuel swirl angle θf. Specifically, an angle of a portion on the downstream side Dad in the fuel swirler 16 with respect to the cylinder axis Ac is the above-described fuel swirl angle θf. For example, the fuel swirl angle θf is 40°.

The air injector 17 has an air injection frame 18 and a plurality of air swirlers 19 that swirl the compressed air A around the cylinder axis Ac. The air injection frame 18 is formed by the small-diameter barrel 13*a* of the inner cylinder 13 and the burner cylinder 15*a*. An annular space between the outer peripheral side of the burner cylinder 15*a* and the inner peripheral side of the small-diameter barrel 13*a* forms an air flow path through which the compressed air A flows. The compressed air A flowing into the inner peripheral side of the support cylinder 12 from the air introduction opening 12*a* of the support cylinder 12 flows into the air flow path from a gap between the outer peripheral side of the burner cylinder 15*a* and an end edge of the small-diameter barrel 13*a* on the upstream side Dau. The compressed air A flows inside the air flow path, and is ejected from an air injection port 17*j* into the combustion space S as primary combustion air A1. The air injection port 17*j* has an annular shape around the cylinder axis Ac, and is formed by the end edge of the burner cylinder 15*a* on the downstream side Dad and by an end edge of the small-diameter barrel 13*a* on the downstream side Dad. The plurality of air swirlers 19 are disposed inside the air flow path. In the air swirler 19, a radial outer end with respect to the cylinder axis Ac is connected to the inner peripheral surface of the small-diameter barrel 13*a*, and a radial inner end with respect to the cylinder axis Ac is connected to the outer peripheral surface of the burner cylinder 15*a*. The plurality of air swirlers 19 are configured so that an angle of the compressed air A (primary combustion air A1) ejected from the air injection port 17*j* into the combustion space S with respect to the cylinder axis Ac becomes a predetermined air swirl angle. Specifically, an angle of a portion on the downstream side Dad in the air swirler 19 with respect to the cylinder axis Ac is the above-described air swirl angle. For example, the air swirl angle is 35°.

The combustion cylinder 20 serving as the combustor cylinder has a barrel 21 forming a cylindrical shape around the cylinder axis Ac, and an air supply pipe 40 attached to the barrel 21. The air supply pipe 40 may be referred to as a scoop. The cylindrical barrel 21 defines a circumference of the combustion space S through which the combustion gas G flows. An end of the barrel 21 on the upstream side Dau is connected to an end of the inner cylinder 13 on the downstream side Dad. In addition, as illustrated in FIG. 1, the end of the barrel 21 on the downstream side Dad is connected to a combustion gas inlet 5*i* of the turbine 5.

The barrel 21 has an inner peripheral surface 23*i* facing the combustion gas G, an outer peripheral surface 22*o* facing a side opposite to the inner peripheral surface 23*i*, a circular insertion opening 25 penetrating the inner peripheral surface 23*i* from the outer peripheral surface 22*o*, and a plurality of cooling flow paths 30 through which a cooling medium flows between the inner peripheral surface 23*i* and the outer peripheral surface 22*o*. As can be seen from at least FIGS. 1, 2, and 4-7, the cooling flow paths 30 are separate and independent (i.e., individually contained and discrete side-by-side flow paths rather than meandering streams generally flowing in the same direction but not separated from each other so as to merge together in locations). The cooling medium herein is the compressed air A floating inside the intermediate casing (refer to FIG. 1). The plurality of cooling flow paths 30 each have an inlet 30*i* that is open on the outer peripheral surface 22*o* of the barrel 21 to introduce the compressed air A into the cooling flow path, and an outlet 30*o* that is open on the inner peripheral surface 23*i* to discharge the compressed air A flowing through the cooling flow path 30. In the present embodiment, the inlet 30*i* is formed in one end (a first end) of the cooling flow path 30, and the outlet 30*o* is formed in the other end (a second end).

Figure 5:
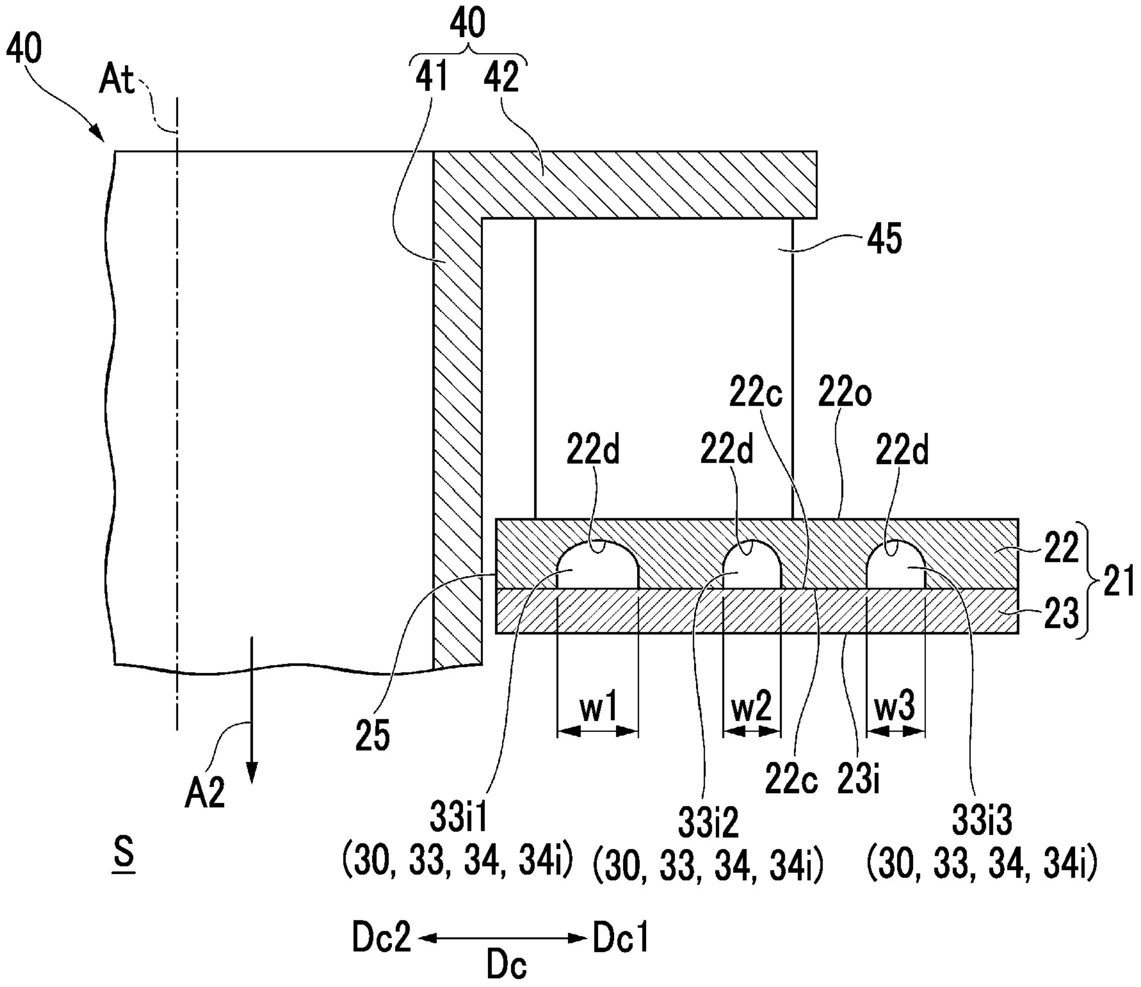
FIG. 5 is a sectional view taken along line V-V in FIG. 4.

As illustrated in FIG. 5, the barrel 21 has an outer plate 22 and an inner plate 23. One surface of a pair of surfaces facing opposite directions in the outer plate 22 forms the outer peripheral surface 22*o* of the barrel 21, and the other surface forms a joint surface 22*c*. In addition, one surface of a pair of surfaces facing opposite directions in the inner plate 23 forms a joint surface 23*c*, and the other surface forms the inner peripheral surface 23*i* of the barrel 21. A plurality of long grooves 22*d* which are recessed on an outer surface side and long are formed on the joint surface 22*c* of the outer plate 22. The outer plate 22 and the inner plate 23 are joined in such a manner that the joint surfaces 22*c* and 23*c* are joined to each other by brazing. Since the outer plate 22 and the inner plate 23 are joined, an opening of the long groove 22*d* formed in the outer plate 22 is closed by the inner plate 23, and the inside of the long groove 22*d* serves as the cooling flow path 30. Therefore, the plurality of cooling flow paths 30 extend in a direction along the inner peripheral surface 23*i* between the outer peripheral surface 22*o* and the inner peripheral surface 23*i* of the barrel 21.

Figure 4:
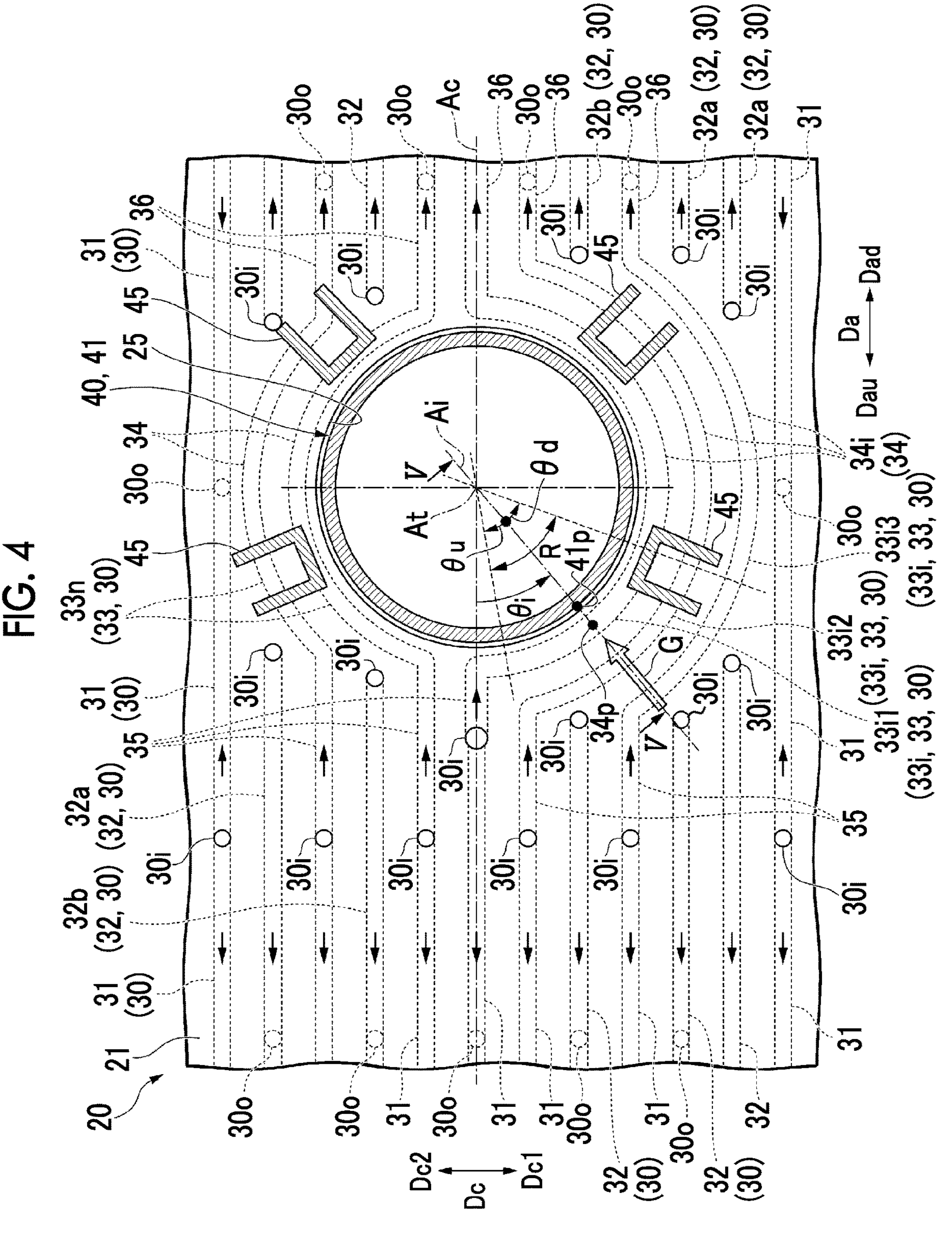
FIG. 4 is a sectional view of a combustor cylinder according to the embodiment of the present disclosure.

As illustrated in FIGS. 2, 4, and 5, the air supply pipe 40 has a pipe portion 41 forming a cylindrical shape around a pipe center axis At and a flange portion 42 fixed to the pipe portion 41. A portion of the pipe portion 41 is inserted into the inner peripheral side of the barrel 21 from the insertion opening 25 of the barrel 21, and protrudes to the inner peripheral side of the barrel 21. In view of a difference in the amount of thermal deformation between the pipe portion 41 and the barrel 21, there is a slight gap between the outer peripheral surface of the pipe portion 41 and an edge of the insertion opening 25. The flange portion 42 is fixed to an end of the pipe portion 41 protruding to the outer peripheral side of the barrel 21. The flange portion 42 protrudes from the pipe portion 41 in a radial direction with respect to the pipe center axis At. A plurality of pipe fixing blocks 45 are disposed between the flange portion 42 of the air supply pipe 40 and the outer peripheral surface 22*o* of the barrel 21. One surface of the pipe fixing block 45 is joined to the outer peripheral surface 22*o* of the barrel 21, and the other surface of the pipe fixing block 45 is joined to the flange portion 42 of the air supply pipe 40. The air supply pipe 40 is fixed to the barrel 21 by the plurality of pipe fixing blocks 45. In a state where the air supply pipe 40 is fixed to the barrel 21, the pipe center axis At of the air supply pipe 40 extends in the radial direction with respect to the cylinder axis Ac. The air supply pipe 40 introduces the compressed air A floating inside the intermediate casing 9 (refer to FIG. 1) to the inner peripheral side of the barrel 21 as secondary combustion air A2.

As illustrated in FIG. 5, in the present embodiment, in the plurality of cooling flow paths 30, the outlets 30*o* of two cooling flow paths 30 adjacent to each other in the circumferential direction Dc are located at positions different from each other in the cylinder axis direction Da. In addition, in some cases of the present embodiment, in the plurality of cooling flow paths 30, the inlet 30*i* of one cooling flow path 30 may be a shared inlet 30*i* with another cooling flow path 30. In addition, in some cases of the present embodiment, in the plurality of cooling flow paths 30, the outlet 30*o* of one cooling flow path 30 may be a shared outlet 30*o* with another cooling flow path 30. In the present embodiment, in the plurality of cooling flow paths 30, a part forms a plurality of normal flow paths 31, another part forms a plurality of complementary flow paths 32, and the remaining part forms a plurality of opening circumference flow paths 33.

Each of the plurality of opening circumference flow paths 33 has a circumvention flow path portion 34 extending along an edge of the insertion opening 25, an upstream-side flow path portion 35 extending from an end of the circumvention flow path portion 34 on the upstream side Dau to the upstream side Dau in the cylinder axis direction Da, and a downstream-side flow path portion 36 extending from an end of the circumvention flow path portion 34 on the downstream side Dad to the downstream side Dad in the cylinder axis direction Da. Both the upstream-side flow path portion 35 and the downstream-side flow path portion 36 are linear flow path portions extending in the cylinder axis direction Da. On the other hand, the circumvention flow path portion 34 is an arc-shaped flow path portion extending along the edge of the circular insertion opening 25. The inlet 30*i* of the opening circumference flow path 33 is formed in one of the upstream-side flow path portion 35 and the downstream-side flow path portion 36. The inlet 30*i* is shared with the inlet 30*i* of one normal flow path 31 of the plurality of normal flow paths 31. In addition, the outlet 30*o* of the opening circumference flow path 33 is formed in the other of the upstream-side flow path portion 35 and the downstream-side flow path portion 36. The outlet 30*o* shares the compressed air with the outlet 30*o* of another normal flow path 31 of the plurality of normal flow paths 31. The inlet 30*i* and the outlet 30*o* of the opening circumference flow path 33 are not formed in the circumvention flow path portion 34.

Here, a line extending in a flowing direction of, of the combustion gas G, the combustion gas G directed toward the pipe center axis At, which is the radial direction with respect to the pipe center axis At, will be referred to as a collision gas axis Ai. In the present embodiment, the flowing direction of the combustion gas G directed toward the pipe center axis At with respect to the cylinder axis Ac is approximately the same as the above-described fuel swirl angle θf, which is 40°. Therefore, a collision axis angle θi, which is an angle formed by the collision gas axis Ai of the present embodiment with respect to the cylinder axis Ac, is 40°. An intersection position of the collision gas axis Ai and the outer peripheral surface 22*o* of the air supply pipe 40 forms a main collision position 41*p*.

A part of the plurality of opening circumference flow paths 33 forms a plurality of impingement flow paths 33*i*, and the rest forms a plurality of non-impingement flow paths 33*n*. The circumvention flow path portion 34 of the impingement flow path 33*i* forms an impingement circumvention flow path portion 34*i*. Here, as illustrated in FIG. 4, in the circumferential direction Dc, a side where the main collision position 41*p* exists with reference to the pipe center axis At will be referred to as a circumferential first side Dc1, and an opposite side will be referred to as a circumferential second side Dc2. All of the impingement circumvention flow path portions 34*i* for each of the plurality of impingement flow paths 33*i* exist on the circumferential first side Dc1 with reference to the pipe center axis At. On the other hand, all of the circumvention flow path portions 34 for each of the non-impingement flow paths 33*n* exist on the circumferential second side Dc2 with reference to the pipe center axis At.

The impingement circumvention flow path portion 34*i* for each of the plurality of impingement flow paths 33*i* intersects with the collision gas axis Ai. An intersection position 34*p* intersecting with the collision gas axis Ai is located on the upstream side Dau of the pipe center axis At and on the circumferential first side Dc1 of the pipe center axis At.

When the combustion gas G flowing inside the barrel 21 collides with the air supply pipe 40, whereas a dynamic pressure thereof is lowered, a static pressure thereof rises. A static pressure rise region R in which the combustion gas G collides with the air supply pipe 40 and the static pressure of the combustion gas G rises is within a range of a predetermined angle (θu+θd) around the pipe center axis At, which is an angle around the collision gas axis Ai. Specifically, the static pressure rise region R is within a range of a predetermined upstream-side angle θu from the collision gas axis Ai to the upstream side Dau, which is an angle around the pipe center axis At, and is within a range of a predetermined downstream-side angle θd from the collision gas axis Ai to the downstream side Dad. Here, the predetermined angle (θu+θd) varies depending on a flow speed immediately before the combustion gas G collides with the air supply pipe 40. Therefore, the predetermined angle (θu+θd) is 60°±20°. Specifically, the upstream-side angle θu and the downstream-side angle θd are 30°±10°. The upstream-side angle θu and the downstream-side angle θd of the present embodiment are 30°.

The impingement circumvention flow path portion 34*i* extends in a direction having a direction component of the upstream side Dau from the collision gas axis Ai along the edge of the insertion opening 25, and extends in a direction having a direction component of the downstream side Dad from the collision gas axis Ai along the edge of the insertion opening 25. An end of a portion extending in the direction having the direction component of the upstream side Dau from the collision gas axis Ai is connected to the upstream-side flow path portion 35 of the impingement flow path 33*i*. In addition, an end of a portion extending in the direction having the direction component of the downstream side Dad from the collision gas axis Ai is connected to the downstream-side flow path portion 36 of the impingement flow path 33*i*.

As described above, the inlet 30*i* and the outlet 30*o* are not formed in the circumvention flow path portion 34 for each of the plurality of opening circumference flow paths 33. Therefore, in the impingement circumvention flow path portion 34*i*, the inlet 30*i* and the outlet 30*o* are not formed in a portion existing in the static pressure rise region R, within the range of the upstream-side angle θu from the collision gas axis Ai to the upstream side Dau and within the range of the downstream-side angle θd from the collision gas axis Ai to the downstream side Dad.

Here, in the plurality of impingement flow paths 33*i*, the impingement flow path 33*i* in which the impingement circumvention flow path portion 34*i* is closest to the insertion opening 25 will be referred to as a first impingement flow path 33*i*1. The impingement flow path 33*i* adjacent to the circumferential first side Dc1 with respect to the first impingement flow path 33*i*1 will be referred to as a second impingement flow path 33*i*2, and the impingement flow path 33*i* adjacent to the circumferential first side Dc1 with respect to the second impingement flow path 33*i*2 will be referred to as a third impingement flow path 33*i*3. As illustrated in FIG. 5, a width w1 of the first impingement flow path 33*i*1 is wider than a width w2 of the second impingement flow path 33*i*2 and a width w3 of the third impingement flow path 33*i*3. Therefore, a flow path cross-sectional area of the first impingement flow path 33*i*1 is wider than a flow path cross-sectional area of the second impingement flow path 33*i*2 and a flow path cross-sectional area of the third impingement flow path 33*i*3.

Each of the plurality of normal flow paths 31 and the plurality of complementary flow paths 32 is a linear flow path extending in the cylinder axis direction Da. One of the inlet 30*i* and the outlet 30*o* is formed in an end of the upstream side Dau in the plurality of normal flow paths 31 and the plurality of complementary flow paths 32. In addition, the other of the inlet 30*i* and the outlet 30*o* is formed in an end of the downstream side Dad in the plurality of normal flow paths 31 and the plurality of complementary flow paths 32.

All of the plurality of complementary flow paths 32 exist inside the region in the circumferential direction Dc where the circumvention flow path portion 34 of at least one opening circumference flow path 33 in the plurality of opening circumference flow paths 33 exists, and are located at the same position in the cylinder axis direction Da with respect to a portion of the circumvention flow path portion 34 of at least one opening circumference flow path 33. In the present embodiment, all of the inlets 30*i* for each of the plurality of complementary flow paths 32 are formed in the ends on the side close to the insertion opening 25 in the cylinder axis direction Da (i.e., at the end closest to the insertion opening, as shown in FIG. 4).

As described above, the plurality of normal flow paths 31 are flow paths excluding the plurality of opening circumference flow paths 33 and the plurality of complementary flow paths 32 in the plurality of cooling flow paths 30. In the present embodiment, in the plurality of normal flow paths 31, some of the normal flow paths 31 are adjacent to a side far from the insertion opening 25 in the circumferential direction Dc with respect to the circumvention flow path portion 34 of one opening circumference flow path 33. As described above, the circumvention flow path portion 34 has an arc shape, and the normal flow path 31 has a linear shape. Therefore, a portion having a short distance therebetween and a portion having a long distance therebetween exist between the normal flow path 31 and the circumvention flow path portion 34 in the circumferential direction Dc. In the plurality of complementary flow paths 32, some of the complementary flow paths 32*a* are disposed in the portion having the long distance therebetween, between the normal flow path 31 and the circumvention flow path portion 34 in the circumferential direction Dc, and play a role of cooling a portion thereof. In addition, in the plurality of complementary flow paths 32, the other complementary flow paths 32*b* are disposed between the upstream-side flow path portions 35 or between the downstream-side flow path portions 36 of the two opening circumference flow paths 33 adjacent to each other in the circumferential direction Dc, and play a role of cooling the portion therebetween.

A temperature of the cooling medium flowing through a portion of the cooling flow path 30 which is close to the outlet 30*o* of the cooling flow path 30 is higher than a temperature of the cooling medium flowing through a portion of the cooling flow path 30 which is close to the inlet 30*i* of the cooling flow path 30. Therefore, cooling capacity of a portion close to the outlet 30*o* of the cooling flow path 30 in the cooling flow path 30 is smaller than cooling capacity of a portion close to the inlet 30*i* of the cooling flow path 30 in the cooling flow path 30. Therefore, when the outlets 30*o* of the two cooling flow paths 30 adjacent to each other in the circumferential direction Dc are located at the same position in the cylinder axis direction Da, the cooling capacity of the portion close to each outlet 30*o* of the two cooling flow paths 30 becomes extremely low. In the present embodiment, the outlets 30*o* of the two cooling flow paths 30 adjacent to each other in the circumferential direction Dc are located at positions different from each other in the cylinder axis direction Da. Therefore, it is possible to prevent the cooling capacity of the portion close to each outlet 30*o* of the two cooling flow paths 30 from becoming extremely low.

The barrel 21 of the present embodiment has the plurality of opening circumference flow paths 33 having the circumvention flow path portion 34 extending along the edge of the insertion opening 25. Therefore, in the present embodiment, the edge of the insertion opening 25 can be cooled by the cooling medium flowing through the circumvention flow path portion 34.

In the present embodiment, in the static pressure rise region R around the air supply pipe 40, the impingement circumvention flow path portion 34*i* of the impingement flow path 33*i* is formed along the edge of the insertion opening 25. The outlet 30*o* of the impingement flow path 33*i* is not formed in a portion inside the static pressure rise region R in the impingement circumvention flow path portion 34*i*. Therefore, even when the combustion gas G inside the barrel 21 collides with the air supply pipe 40 and the static pressure of the combustion gas G rises inside the static pressure rise region R, it is possible to prevent a backflow of the combustion gas G into the impingement flow path 33*i*.

In addition, in the present embodiment, in the plurality of impingement flow paths 33*i*, the flow path cross-sectional area of the first impingement flow path 33*i*1 in which the impingement circumvention flow path portion 34*i* is closest to the insertion opening 25 is wider than the flow path cross-sectional area of the other impingement flow paths 33*i*. Therefore, a flow rate of the compressed air serving as the cooling medium flowing through the first impingement flow path 33*i*1 is higher than a flow rate of the compressed air serving as the cooling medium flowing through the other impingement flow paths 33*i*. Furthermore, in the present embodiment, all of the inlets 30*i* for each of the plurality of complementary flow paths 32 are formed in the ends on the side close to the insertion opening 25 in the cylinder axis direction Da. Therefore, in the present embodiment, the portion of the barrel 21 which is close to the insertion opening 25 can be actively cooled.

In the present embodiment, from the above-described viewpoint, it is possible to prevent burning of the barrel 21 in the vicinity of the air supply pipe 40, and it is possible to improve durability of the combustion cylinder 20.

[First Modification Example of Combustor Cylinder]

Figure 6:
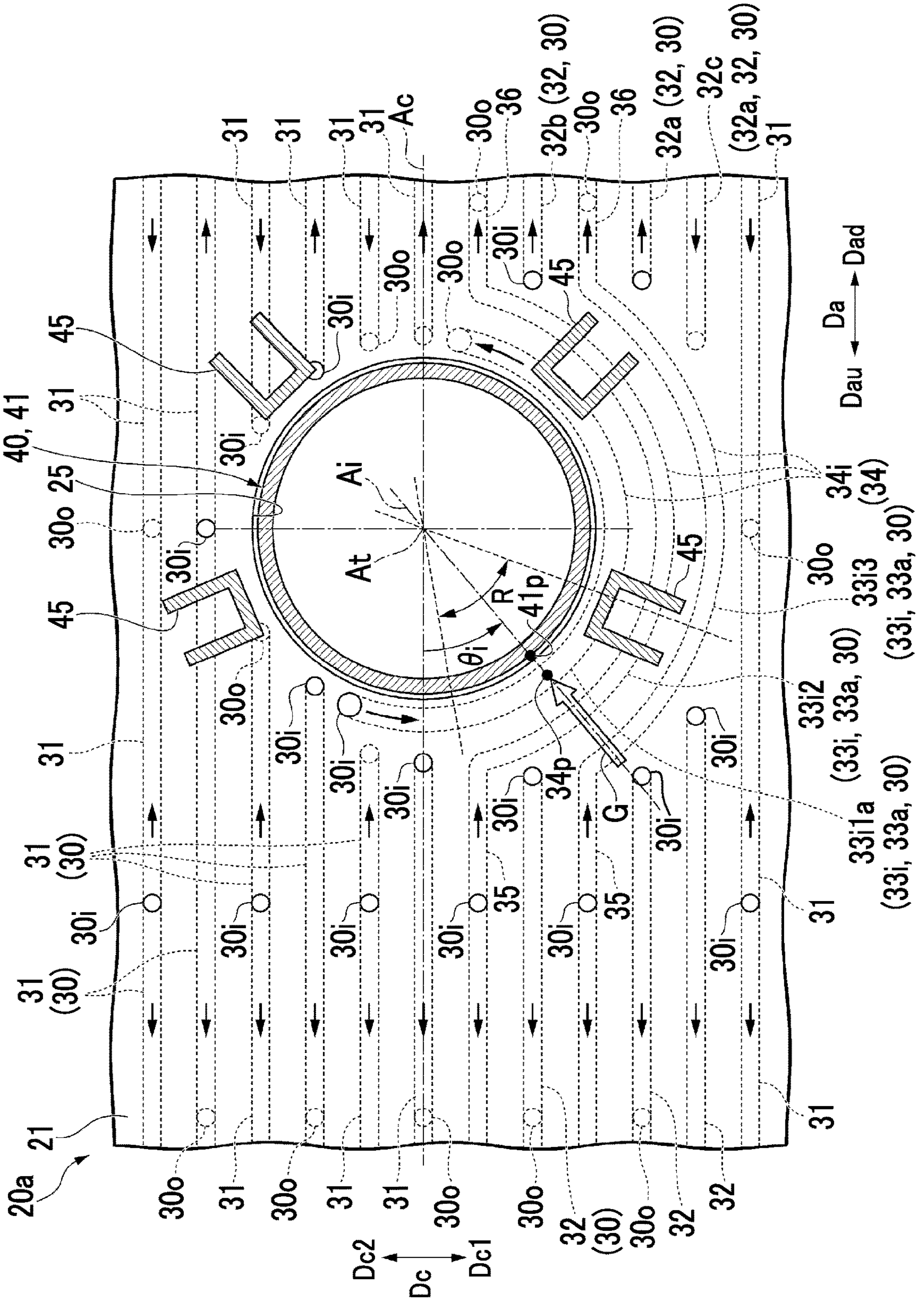
FIG. 6 is a plan view of a combustor cylinder according to a first modification example of the embodiment of the present disclosure.

A first modification example of the combustor cylinder in the above-described embodiment will be described with reference to FIG. 6.

As in the combustor cylinder in the first embodiment, the combustor cylinder of the present modification example is a combustion cylinder 20*a*. The combustion cylinder 20*a* of the present modification example is different from the combustion cylinder 20 in the first embodiment in shapes and disposition of the plurality of cooling flow paths, and other configurations are the same.

Also in the present modification example, as in the above-described embodiment, a part of the plurality of cooling flow paths 30 forms a plurality of opening circumference flow paths 33*a*, another part forms the complementary flow path 32, and the remaining part forms the normal flow path 31.

All of the plurality of opening circumference flow paths 33*a* in the present modification example are the impingement flow paths 33*i*. That is, the plurality of opening circumference flow paths 33*a* in the present modification example do not include the non-impingement flow path 33*n* in the above-described embodiment.

As in the impingement flow path 33*i* in the above-described embodiment, each of the plurality of impingement flow paths 33*i* has the impingement circumvention flow path portion 34*i* extending along the edge of the insertion opening 25 and forming an arc shape.

As in the above-described embodiment, the impingement circumvention flow path portion 34*i* for each of the plurality of impingement flow paths 33*i* intersects with the collision gas axis Ai. The intersection position 34*p* intersecting with the collision gas axis Ai is located on the upstream side Dau of the pipe center axis At and in the circumferential direction Dc of the pipe center axis At. The impingement circumvention flow path portion 34*i* extends in a direction having a direction component of the upstream side Dau from the collision gas axis Ai along the edge of the insertion opening 25, and extends in a direction having a direction component of the downstream side Dad from the collision gas axis Ai along the edge of the insertion opening 25. The inlet 30*i* and the outlet 30*o* are not formed in the portion existing in the static pressure rise region R in the impingement circumvention flow path portion 34*i*.

Of the plurality of impingement flow paths 33*i*, a first impingement flow path 33*i*1*a* in which the impingement circumvention flow path portion 34*i* is closest to the insertion opening 25 does not have the upstream-side flow path portion 35 and the downstream-side flow path portion 36, unlike the first impingement flow path 33*i*1 in the above-described embodiment. Therefore, in the impingement circumvention flow path portion 34*i* of the first impingement flow path 33*i*1*a* in the present modification example, the inlet 30*i* is formed in one end of the impingement circumvention flow path portion 34*i*, and the outlet 30*o* is formed in the other end. However, as described above, the outlet 30*o* is not formed inside the static pressure rise region R. Meanwhile, in the plurality of impingement flow paths 33*i*, as in the second impingement flow path 33*i*2 and the third impingement flow path 33*i*3 in the first embodiment, the second impingement flow path 33*i*2 and the third impingement flow path 33*i*3 have the upstream-side flow path portion 35 and the downstream-side flow path portion 36, in addition to the impingement circumvention flow path portion 34*i*.

Also in the present modification example, as in the above-described embodiment, the impingement circumvention flow path portion 34*i* of the impingement flow path 33*i* is formed along the edge of the insertion opening 25 in the static pressure rise region R around the air supply pipe 40. The outlet 30*o* of the impingement flow path 33*i* is not formed in a portion inside the static pressure rise region R in the impingement circumvention flow path portion 34*i*. Therefore, even when the combustion gas G inside the barrel 21 collides with the air supply pipe 40 and the static pressure of the combustion gas G rises inside the static pressure rise region R, it is possible to prevent a backflow of the combustion gas G into the impingement flow path 33*i*.

As described above, when the impingement circumvention flow path portion 34*i* exists in the static pressure rise region R around the air supply pipe 40, it is not necessary to substantially cover the entire circumference of the insertion opening 25 with the circumvention flow path portion 34 of the plurality of opening circumference flow paths 33 as in the first embodiment. In addition, as long as the impingement circumvention flow path portion 34*i* is provided, the impingement flow path 33*i* may not have the upstream-side flow path portion 35 and the downstream-side flow path portion 36. In addition, the inlet 30*i* and the outlet 30*o* may be formed in the impingement circumvention flow path portion 34*i*.

In the plurality of complementary flow paths 32 in the present modification example, the inlets 30*i* of some of the complementary flow paths 32 are formed in the ends on the side close to the insertion opening 25 in the cylinder axis direction Da. In addition, in the plurality of complementary flow paths 32 in the present modification example, the inlets 30*i* of some of the complementary flow paths 32*c* are formed in the ends on the side far from the insertion opening 25 in the cylinder axis direction Da. That is, the inlets 30*i* for each of all of the complementary flow paths 32 may not be formed in the ends on the side close to the insertion opening 25 in the cylinder axis direction Da.

[Second Modification Example of Combustor Cylinder]

Figure 7:
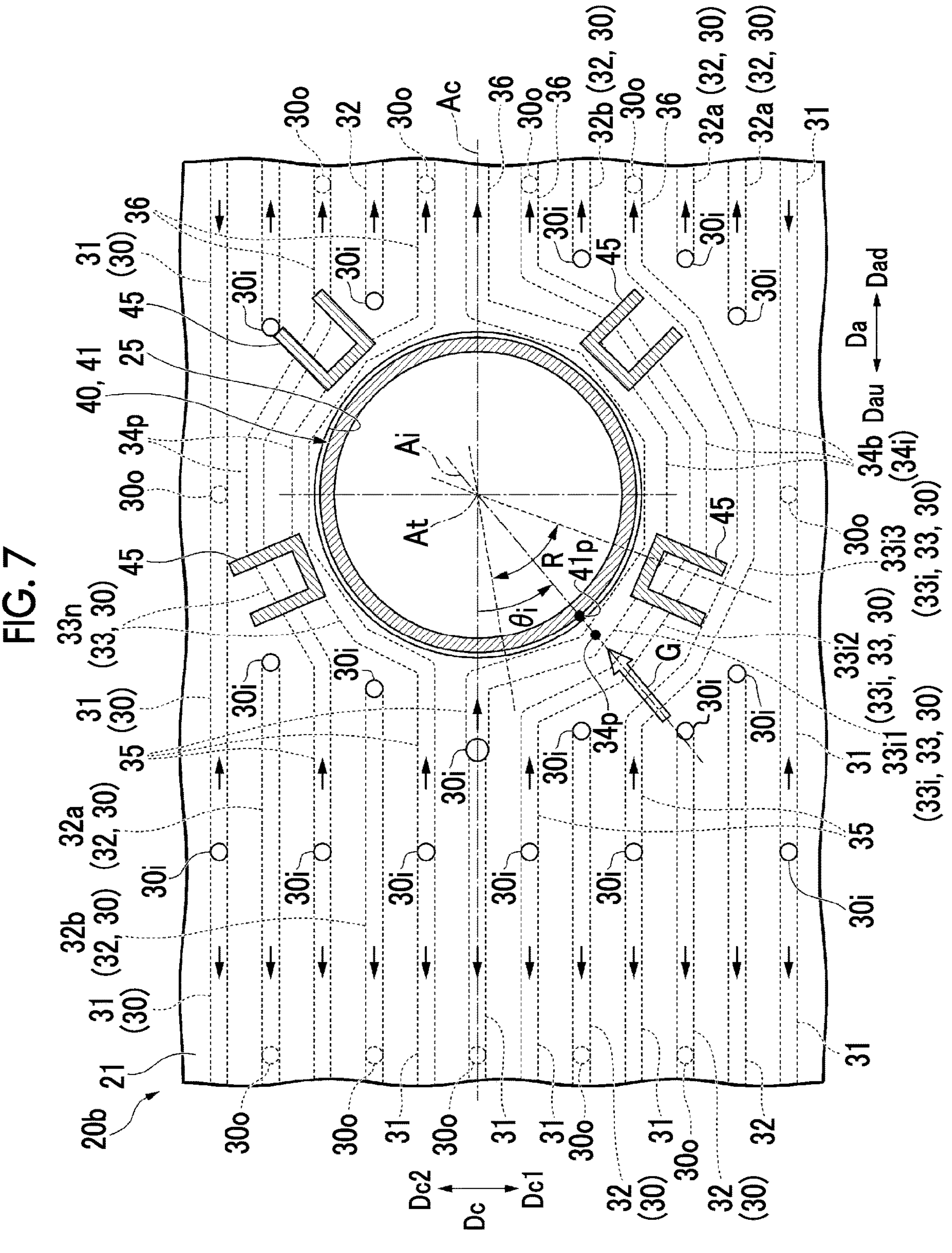
FIG. 7 is a plan view of a combustor cylinder according to a second modification example of the embodiment of the present disclosure.

A second modification example of the combustion cylinder in the first embodiment will be described with reference to FIG. 7.

As in the combustor cylinder in the above-described embodiment, the combustor cylinder of the present modification example is a combustion cylinder 20*b*. The combustion cylinder 20*b* of the present modification example is different from the combustion cylinder 20 in the first embodiment in shapes of the plurality of circumvention flow path portions, and other configurations are the same.

All of the circumvention flow path portions 34 in the above-described embodiment form an arc shape in accordance with a shape of the circular insertion opening 25. On the other hand, all of the circumvention flow path portions 34*b* of the present modification example do not have the arc shape, and have a shape in which a plurality of straight line portions are connected to each other. Even when the circumvention flow path portion 34*b* has this shape, as long as the circumvention flow path portion 34*b* extends along the edge of the insertion opening 25, it is possible to achieve substantially the same advantageous effect as that of the circumvention flow path portion 34 in the above-described embodiment. However, a pressure loss of the compressed air A in the arc-shaped circumvention flow path portion 34 is smaller than that in the circumvention flow path portion 34*b* having this shape. Accordingly, when it is not difficult to manufacture the arc-shaped circumvention flow path portion 34, it is preferable that the circumvention flow path portion has the arc shape.

Other Modification Examples

In the above-described embodiment and each modification example, the fuel swirl angle of and the collision axis angle θi are substantially the same. However, depending on a relationship between a ratio of the injection flow rate of the fuel F to the injection flow rate of the combustion air A1 and the swirl angle of the combustion air A1, the collision axis angle θi with respect to the fuel swirl angle θf may vary within a range of the fuel swirl angle of θf±15° in some cases. Therefore, the collision axis angle θi, which is an angle of the collision gas axis Ai with respect to the cylinder axis Ac, is not limited to 40°, and may be any angle within a range of an angle of 40°±15°.

Some combustors do not swirl the combustion gas G around the cylinder axis Ac inside the combustion space. In this case, the collision gas axis Ai extends in the cylinder axis direction Da. That is, the collision axis angle θi, which is an angle of the collision gas axis Ai with respect to the cylinder axis Ac, may be 0°.

In the above-described embodiment and each modification example, the air supply pipe 40 is attached to the barrel 21 of the combustion cylinder 20. However, when the length of the large-diameter barrel 13*c* of the inner cylinder 13 in the cylinder axis direction Da is long, the air supply pipe 40 may be attached to the large-diameter barrel 13*c* in some cases. In this case, the barrel of the combustion cylinder including the air supply pipe 40 is the large-diameter barrel 13*c* of the inner cylinder 13.

The fuel F in the above-described embodiment and each modification example is mainly BFG. However, the fuel F may be another fuel F. Specifically, the fuel F may be a natural gas or COG.

ADDITIONAL NOTES

For example, the combustor cylinder in the above-described embodiment and modification examples is understood as follows.

(1) According to a first aspect, there is provided the combustor cylinder including the barrel 21 that forms a cylindrical shape around the cylinder axis Ac and that defines the circumference of the combustion space S through which the combustion gas G flows in a direction having a direction component from, of the upstream side Dau and the downstream side Dad in the cylinder axis direction Da in which the cylinder axis Ac extends, the upstream side Dau to the downstream side Dad, and the air supply pipe 40 attached to the barrel 21. The cylindrical barrel 21 has the inner peripheral surface 23*i* facing the combustion gas G, the outer peripheral surface 22*o* facing the side opposite to the inner peripheral surface 23*i*, the insertion opening 25 that penetrates the inner peripheral surface 23*i* from the outer peripheral surface 22*o*, and the plurality of cooling flow paths 30 extending between the inner peripheral surface 23*i* and the outer peripheral surface 22*o* in the direction along the inner peripheral surface 23*i* and through the inside of which the cooling medium flows. A part of the air supply pipe 40 is inserted into the inner peripheral side of the barrel 21 from the insertion opening 25, and protrudes to the inner peripheral side of the barrel 21. Each of the plurality of cooling flow paths 30 has the inlet 30*i* configured to introduce the cooling medium into the cooling flow path 30, and the outlet 30*o* configured to discharge the cooling medium flowing into the cooling flow path 30. The plurality of cooling flow paths 30 have the plurality of opening circumference flow paths 33, as some cooling flow paths 30 in the plurality of cooling flow paths 30. The plurality of opening circumference flow paths 33 have the circumvention flow path portion 34 extending along the edge of the insertion opening 25. In the plurality of opening circumference flow paths 33, at least one opening circumference flow path 33 forms the impingement flow path 33*i*. The impingement flow path 33*i* has the impingement circumvention flow path portion 34*i*, as the circumvention flow path portion 34. The impingement circumvention flow path portion 34*i* intersects with the collision gas axis Ai extending in the flowing direction of, of the combustion gas G, the combustion gas G directed toward the pipe center axis At, which is the radial direction of the air supply pipe 40 with respect to the pipe center axis At, extends in the direction having the direction component of the upstream side Dau along the edge of the insertion opening 25 from the collision gas axis Ai, and extends in the direction having the direction component of the downstream side Dad along the edge of the insertion opening 25 from the collision gas axis Ai. In the impingement circumvention flow path portion 34*i*, the intersection position 34*p* intersecting with the collision gas axis Ai is located on the upstream side Dau of the pipe center axis At. In the impingement circumvention flow path portion 34*i*, the outlet 30*o* which opens on the inner peripheral surface 23*i* is not formed in the portion within a range of a predetermined angle (θu+θd) around the collision gas axis Ai which is the angle around the pipe center axis At.

When the combustion gas G flowing inside the barrel 21 collides with the air supply pipe 40, whereas a dynamic pressure thereof is lowered, a static pressure thereof rises. The static pressure rise region R in which the combustion gas G collides with the air supply pipe 40 and the static pressure of the combustion gas G rises is within the range of the predetermined upstream-side angle θu from the collision gas axis Ai to the upstream side Dau, which is the angle around the pipe center axis At, and is within the range of the predetermined downstream-side angle θd from the collision gas axis Ai to the downstream side Dad. In the present aspect, the plurality of opening circumference flow paths 33 having the circumvention flow path portion 34 extending along the edge of the insertion opening 25 are provided. Therefore, the edge of the insertion opening 25 can be cooled by the cooling medium flowing through the circumvention flow path portion 34. Moreover, in the present aspect, the outlet 30*o* of the impingement flow path 33*i* having the impingement circumvention flow path portion 34*i* is not formed in the portion inside the static pressure rise region R in the impingement circumvention flow path portion 34*i*. Therefore, in the present aspect, even when the combustion gas G inside the barrel 21 collides with the air supply pipe 40 and the static pressure of the combustion gas G rises inside the static pressure rise region R, it is possible to prevent a backflow of the combustion gas G into the impingement flow path 33*i*.

(2) According to a second aspect of the combustor cylinder, in the combustor cylinder according to the first aspect, the predetermined angle (θu+θd) is 60°±20°.

The predetermined angle (θu+θd) varies depending on the flow speed immediately before the combustion gas G collides with the air supply pipe 40. Therefore, the predetermined angle (θu+θd) is 60°±20°.

(3) According to a third aspect of the combustor cylinder, in the combustor cylinder according to the first aspect or the second aspect, the collision gas axis Ai forms the angle θi of 40°±15° with respect to the cylinder axis Ac.

When the fuel F is swirled around the cylinder axis Ac inside the combustion space S on the inner peripheral side of the barrel 21, the collision axis angle θi, which is the angle of the collision gas axis Ai with respect to the cylinder axis Ac, is approximately 40°. However, the collision axis angle θi slightly varies depending on the relationship between the ratio of the injection flow rate of the fuel F to the injection flow rate of the combustion air A1 and the swirl angle of the combustion air A1. Therefore, the collision axis angle θi is not limited to 40°, and may be any angle within an angle range of 40°±15°.

(4) According to a fourth aspect of the combustor cylinder, in the combustor cylinder according to any one of the first aspect to the third aspect, the plurality of opening circumference flow paths 33 have the upstream-side flow path portion 35 extending from the end of the upstream side Dau of the circumvention flow path portion 34 to the upstream side Dau in the cylinder axis direction Da. The upstream-side flow path portion 35 has one of the inlet 30*i* and the outlet 30*o*.

(5) According to a fifth aspect of the combustor cylinder, in the combustor cylinder according to any one of the first aspect to the fourth aspect, the plurality of opening circumference flow paths 33 have the downstream-side flow path portion 36 extending from the end of the downstream side Dad of the circumvention flow path portion 34 to the downstream side Dad in the cylinder axis direction Da.

(6) According to a sixth aspect of the combustor cylinder, in the combustor cylinder according to any one of the first aspect to the third aspect, the plurality of opening circumference flow paths 33 have the upstream-side flow path portion 35 extending from the end of the upstream side Dau of the circumvention flow path portion 34 to the upstream side Dau in the cylinder axis direction Da, and the downstream-side flow path portion 36 extending from the end of the downstream side Dad of the circumvention flow path portion 34 to the downstream side Dad in the cylinder axis direction Da. One of the inlet 30*i* and the outlet 30*o* is formed in the upstream-side flow path portion 35, and the other of the inlet 30*i* and the outlet 30*o* is formed in the downstream-side flow path portion 36. The inlet 30*i* and the outlet 30*o* are not formed in the circumvention flow path portion 34.

In the present aspect, the outlet 30*o* of the opening circumference flow path 33 is not formed in the circumvention flow path portion 34 extending along the edge of the insertion opening 25. Therefore, in the present aspect, it is possible to prevent a backflow of the combustion gas G into the circumvention flow path portion 34.

(7) According to a seventh aspect of the combustor cylinder, in the combustor cylinder according to any one of the first aspect to the sixth aspect, the plurality of cooling flow paths 30 have the complementary flow paths 32 extending in the cylinder axis direction Da, as some cooling flow paths 30 in the plurality of cooling flow paths 30. The complementary flow paths 32 exist inside the region in the circumferential direction Dc with respect to the cylinder axis Ac where the circumvention flow path portion 34 of at least one opening circumference flow path 33 in the plurality of opening circumference flow paths 33 exists, and are located at the same position in the cylinder axis direction Da with respect to a portion of the circumvention flow path portion 34 of the at least one opening circumference flow path 33.

In some cases, as one cooling flow path 30 in the plurality of cooling flow paths 30, the normal flow path 31 linearly extending in the cylinder axis direction Da may be provided on the side far from the insertion opening 25 in the circumferential direction Dc with respect to the cylinder axis Ac, with respect to the circumvention flow path portion 34 of the opening circumference flow path 33. In this case, a portion having a short distance therebetween and a portion having a long distance therebetween exist between the normal flow path 31 and the circumvention flow path portion 34 in the circumferential direction Dc. In the plurality of complementary flow paths 32, some of the complementary flow paths 32 are disposed in the portion having the long distance therebetween, between the normal flow path 31 and the circumvention flow path portion 34 in the circumferential direction Dc. Accordingly, in the present aspect, the portion having the long distance between the normal flow path 31 and the circumvention flow path portion 34 in the circumferential direction Dc can be cooled by the cooling medium flowing through the complementary flow path 32.

(8) According to an eighth aspect of the combustor cylinder, in the combustor cylinder according to the seventh aspect, the inlet 30*i* of the complementary flow path 32 is formed in, of both ends of the complementary flow path 32 in the cylinder axis direction Da, the end on the side close to the insertion opening 25.

In the present aspect, the vicinity of the insertion opening 25 can be actively cooled by the cooling medium flowing into the complementary flow path 32 from the inlet 30*i* of the complementary flow path 32.

(9) According to a ninth aspect of the combustor cylinder, in the combustor cylinder according to any one of the first aspect to the eighth aspect, the plurality of opening circumference flow paths 33 have a plurality of the impingement flow paths 33*i*. The impingement circumvention flow path portion 34*i* of, of the plurality of impingement flow paths 33*i*, the first impingement flow path 33*i*1 is closer to the insertion opening 25 than the impingement circumvention flow path portion 34*i*, of the plurality of impingement flow paths 33*i*, of another impingement flow path 33*i* excluding the first impingement flow path 33*i*1. The flow path cross-sectional area of the first impingement flow path 33*i*1 is wider than the flow path cross-sectional area of the other impingement flow path 33*i*.

In the present aspect, the flow path cross-sectional area of the first impingement flow path 33*i*1 is wider than the flow path cross-sectional area of the other impingement flow path 33*i*. Therefore, the flow rate of the cooling medium flowing through the first impingement flow path 33*i*1 is higher than the flow rate of the cooling medium flowing through the other impingement flow path 33*i*. Therefore, in the present aspect, in the above-described static pressure rise region R, the vicinity of the insertion opening 25 can be actively cooled.

(10) According to a tenth aspect of the combustor cylinder, in the combustor cylinder according to any one of the first aspect to the ninth aspect, in the plurality of cooling flow paths 30, the outlets 30*o* of two cooling flow paths 30 adjacent to each other in the circumferential direction Dc with respect to the cylinder axis Ac are located at positions different from each other in the cylinder axis direction Da.

A temperature of the cooling medium flowing through a portion of the cooling flow path 30 which is close to the outlet 30*o* of the cooling flow path 30 is higher than a temperature of the cooling medium flowing through a portion of the cooling flow path 30 which is close to the inlet 30*i* of the cooling flow path 30. Therefore, cooling capacity of a portion close to the outlet 30*o* of the cooling flow path 30 in the cooling flow path 30 is smaller than cooling capacity of a portion close to the inlet 30*i* of the cooling flow path 30 in the cooling flow path 30. Therefore, when the outlets 30*o* of the two cooling flow paths 30 adjacent to each other in the circumferential direction Dc are located at the same position in the cylinder axis direction Da, the cooling capacity of the portion close to each outlet 30*o* of the two cooling flow paths 30 becomes extremely low. In the present aspect, the outlets 30*o* of the two cooling flow paths 30 adjacent to each other in the circumferential direction Dc are located at positions different from each other in the cylinder axis direction Da. Therefore, it is possible to prevent the cooling capacity of the portion close to each outlet 30*o* of the two cooling flow paths 30 from becoming extremely low.

For example, the combustor in the above-described embodiment and modification examples is understood as follows.

(11) According to an eleventh aspect, there is provided the combustor including the combustor cylinder according to any one of the first aspect to the tenth aspect, and the burner 14 disposed on the upstream side Dau of the insertion opening 25 and configured to inject the fuel F into the combustion space S. The burner 14 has the burner frame 15 having the annular fuel injection port 14*j* around the cylinder axis Ac, and the swirler 16 provided inside the burner frame 15 and configured to swirl the fuel F ejected from the fuel injection port 14*j* around the cylinder axis Ac. The swirler 16 is configured so that the angle of the fuel F ejected from the fuel injection port 14*j* with respect to the cylinder axis Ac becomes the predetermined fuel swirl angle θf. The angle of the collision gas axis Ai with respect to the cylinder axis Ac is within the range of the fuel swirl angle θf±15°.

When the fuel F is swirled around the cylinder axis Ac inside the combustion space S on the inner peripheral side of the barrel 21, the collision axis angle θi, which is the angle of the collision gas axis Ai with respect to the cylinder axis Ac, substantially becomes the fuel swirl angle θf. However, the collision axis angle θi slightly varies depending on the relationship between the ratio of the injection flow rate of the fuel F to the injection flow rate of the combustion air A1 and the swirl angle of the combustion air A1. Therefore, the collision axis angle θi does not need to completely coincide with the fuel swirl angle θf, and may be any angle within the angle range of the fuel swirl angle θf±15°.

(12) According to a twelfth aspect of the combustor, in the combustor according to the eleventh aspect, the combustor further includes the air injector 17 disposed on the upstream side Dau of the insertion opening 25 and configured to diffuse and combust the fuel F injected from the burner 14 in the combustion space S by injecting the air into the combustion space S.

For example, the gas turbine in the above-described embodiment and modification examples is understood as follows.

(13) According to a thirteenth aspect, there is provided the gas turbine including the combustor according to the eleventh aspect or the twelfth aspect, the compressor 1 configured to feed the compressed air A to the combustor, and the turbine 5 configured to be driven by the combustion gas G from the combustor.

INDUSTRIAL APPLICABILITY

According to one aspect of the present disclosure, it is possible to improve durability of the combustor cylinder.

REFERENCE SIGNS LIST

1: Compressor
2: Compressor rotor
3: Compressor casing
4: Combustor
5: Turbine
5*i*: Combustion gas inlet
6: Turbine rotor
7: Turbine casing
8: Gas turbine rotor
9: Intermediate casing

10: Combustor body
11: Outer cylinder
11*a*: Outer cylinder barrel
11*b*: Lid
12: Support cylinder
12*a*: Air introduction opening
13: Inner cylinder
13*a*: Small-diameter barrel
13*b*: Increasing diameter barrel
13*c*: Large-diameter barrel
14: Burner
14*j*: Fuel injection port
15: Burner frame
15*a*: Burner cylinder
15*b*: Center cylinder
16: Fuel swirler
17: Air injector
17*j*: Air injection port
18: Air injection frame
19: Air swirler
20, 20*a*, 20*b*: Combustion cylinder (combustor cylinder)
21: Barrel
22: Outer plate
22*o*: Outer peripheral surface
22*c*: Joint surface
22*d*: Long groove
23: Inner plate
23*i*: Inner peripheral surface
23*c*: Joint surface
25: Insertion opening
30: Cooling flow path
30*i*: Inlet
30*o*: Outlet
31: Normal flow path
32, 32*a*, 32*b*, 32*c*: Complementary flow path
33, 33*a*: Opening circumference flow path
33*i*: Impingement flow path
33*n*: Non-impingement flow path
33*i*1, 33*i*1*a*: First impingement flow path
33*i*2: Second impingement flow path
33*i*3: Third impingement flow path
34, 34*b*: Circumvention flow path portion
34*i*: Impingement circumvention flow path portion
34*p*: Intersection position
35: Upstream-side flow path portion
36: Downstream-side flow path portion
40: Air supply pipe
41: Pipe portion
41*p*: Main collision position
42: Flange portion
45: Pipe fixing block
A: Compressed air
Ao: Outside air
A1: Primary air
A2: Secondary air
F: Fuel
G: Combustion gas
S: Combustion space
R: Static pressure rise region
Ar: Rotational axis
Ac: Cylinder axis
Ai: Collision gas axis
At: Pipe center axis
Da: Cylinder axis direction
Dau: Upstream side
Dad: Downstream side
Dc: Circumferential direction
Dc1: Circumferential first side
Dc2: Circumferential second side
θi: Collision axis angle
θu: Upstream-side angle
θd: Downstream-side angle
θf: Fuel swirl angle

The invention claimed is:

1. A combustor cylinder comprising: a barrel having a cylindrical shape around a cylinder axis and defining a circumference of a combustion space through which a combustion gas flows in a direction from an upstream side to a downstream side along the cylinder axis; and an air supply pipe attached to the barrel, wherein the cylindrical barrel has: an inner peripheral surface facing the combustion gas, an outer peripheral surface facing opposite to the inner peripheral surface, an insertion opening penetrating the inner peripheral surface from the outer peripheral surface, and a plurality of separate and independent cooling flow paths extending between the inner peripheral surface and the outer peripheral surface in a direction along the inner peripheral surface, and through which a cooling medium is to flow, wherein a part of the air supply pipe is inserted into an inner peripheral side of the barrel from the insertion opening, and protrudes to the inner peripheral side of the barrel, wherein each of the plurality of cooling flow paths has: an inlet configured to introduce the cooling medium into the respective cooling flow path, and an outlet open at the inner peripheral surface of the cylindrical barrel and configured to discharge the cooling medium flowing through the cooling flow path, wherein the plurality of cooling flow paths comprise a plurality of opening circumference flow paths, each of the plurality of opening circumference flow paths has a circumvention flow path portion extending along an edge of the insertion opening, and at least one of the opening circumference flow paths forms an impingement flow path having an impingement circumvention flow path portion, wherein the impingement circumvention flow path portion intersects with a collision gas axis extending in a flowing direction of the combustion gas directed toward a pipe center axis, the flowing direction being a radial direction of the air supply pipe with respect to the pipe center axis, the impingement circumvention flow path portion extending in a direction having a direction component of the upstream side along the edge of the insertion opening from the collision gas axis, and extending in a direction having a direction component of the downstream side along the edge of the insertion opening from the collision gas axis, wherein an intersection position of the impingement circumvention flow path portion intersecting with the collision gas axis is located on the upstream side of the pipe center axis, and the outlet of the impingement circumvention flow path portion opening on the inner peripheral surface is not formed within a range of a predetermined angle of 60°+-20° around the collision gas axis which is an angle around the pipe center axis, and is formed outside the range of the predetermined angle around the collision gas axis, wherein: the impingement flow path of the plurality of opening circumference flow paths is a first impingement flow path, the plurality of opening circumference flow paths further comprising a second impingement flow path, the impingement circumvention flow path portion of the first impingement flow path is closer to the insertion opening than is the impingement circumvention flow path portion of the second impingement flow path, and a cross-sectional area of the first impingement flow path is wider than a cross-sectional area of the second impingement flow path.

2. The combustor cylinder according to claim 1, wherein the collision gas axis forms an angle of 40°±15° with respect to the cylinder axis.

3. The combustor cylinder according to claim 1, wherein:

each of the plurality of opening circumference flow paths has an upstream-side flow path portion extending from an end of the upstream side of the circumvention flow path portion in an upstream direction of the cylinder axis, and the upstream-side flow path portion has one of the inlet and the outlet.

4. The combustor cylinder according to claim 1, wherein each of the plurality of opening circumference flow paths has a downstream-side flow path portion extending from an end of the downstream side of the circumvention flow path portion in a downstream direction of the cylinder axis.

5. The combustor cylinder according to claim 1, wherein:

each of the plurality of opening circumference flow paths has:

an upstream-side flow path portion extending from an end of the upstream side of the circumvention flow path portion in an upstream direction of the cylinder axis, and a downstream-side flow path portion extending from an end of the downstream side of the circumvention flow path portion in a downstream direction of the cylinder axis, one of the inlet and the outlet is formed in the upstream-side flow path portion, and the other of the inlet and the outlet is formed in the downstream-side flow path portion, and the inlet and the outlet are not formed in the circumvention flow path portion.

6. The combustor cylinder according to claim 1, wherein:

the plurality of cooling flow paths further comprise complementary flow paths extending along the cylinder axis, and the complementary flow paths exist in a region in a circumferential direction of the barrel where the circumvention flow path portion of at least one of the opening circumference flow paths exists, and are located at the same position along the cylinder axis as a portion of the circumvention flow path portion of the at least one of the opening circumference flow paths.

7. The combustor cylinder according to claim 6, wherein the inlet of each of the complementary flow paths is formed in an end of each respective one of the complementary flow paths located closest to the insertion opening.

8. The combustor cylinder according to claim 1, wherein the respective outlets of two cooling flow paths adjacent to each other in a circumferential direction of the barrel are located at different axial positions along the cylinder axis.

9. A combustor comprising:

the combustor cylinder according to claim 1; and a burner on an upstream side of the insertion opening and configured to inject a fuel into the combustion space, wherein the burner includes:

a burner frame having an annular fuel injection port around the cylinder axis of the barrel, and a swirler provided inside the burner frame and configured to swirl the fuel ejected from the fuel injection port around the cylinder axis of the barrel, wherein the swirler is configured so that an angle of the fuel ejected from the fuel injection port with respect to the cylinder axis is ejected at a predetermined fuel swirl angle, and wherein an angle of the collision gas axis with respect to the cylinder axis is within a range of the fuel swirl angle±15°.

10. The combustor according to claim 9, further comprising:

an air injector on the upstream side of the insertion opening and configured to diffuse and combust the fuel injected from the burner in the combustion space by injecting air into the combustion space.

11. A gas turbine comprising:

the combustor according to claim 9;

a compressor configured to feed compressed air to the combustor; and a turbine configured to be driven by the combustion gas from the combustor.

* * * * *